United States Patent [19]

Nagara

[11] 4,209,201
[45] Jun. 24, 1980

[54] LOAD-RESPONSIVE PRESSURE REDUCING VALVE DEVICE FOR USE IN A VEHICLE BRAKE SYSTEM

[75] Inventor: Hiroaki Nagara, Kobe, Japan

[73] Assignee: Sumitomo Electric Industries, Ltd., Osaka, Japan

[21] Appl. No.: 932,803

[22] Filed: Aug. 11, 1978

Related U.S. Application Data

[63] Continuation of Ser. No. 776,655, Mar. 11, 1977, abandoned.

[30] Foreign Application Priority Data

Jun. 29, 1976 [JP] Japan .................. 51-77545

[51] Int. Cl.² ............................ B60T 8/14; B60T 8/22
[52] U.S. Cl. ............................ 303/22 R; 303/24 A; 303/24 F
[58] Field of Search ............ 303/6 C, 22 R, 24 R, 303/24 A, 24 C, 24 F, 84 A, 87; 188/195, 349; 137/38

[56] References Cited

U.S. PATENT DOCUMENTS

| | | | |
|---|---|---|---|
| 3,087,761 | 4/1963 | Stelzer | 303/6 C |
| 3,163,473 | 12/1964 | Stelzer | 303/6 C |
| 3,317,251 | 5/1967 | Hambling | 303/24 C |
| 3,430,660 | 3/1969 | Mitton | 303/87 |
| 3,802,750 | 4/1974 | Kawai | 303/22 R |
| 3,825,303 | 7/1974 | Yabuta | 303/6 C |
| 3,899,217 | 8/1975 | Ohta | 303/24 C |
| 3,944,292 | 3/1976 | Doi' et al. | 303/24 C |
| 4,012,079 | 3/1977 | Takashita | 303/6 C |
| 4,050,744 | 9/1977 | Nogami | 303/6 C |

FOREIGN PATENT DOCUMENTS

| | | | |
|---|---|---|---|
| 809551 | 4/1969 | Canada | 303/24 F |
| 2119941 | 12/1971 | Fed. Rep. of Germany | 303/24 C |
| 1321921 | 7/1973 | United Kingdom | 303/24 A |

Primary Examiner—Edward R. Kazenske
Attorney, Agent, or Firm—Carothers and Carothers

[57] ABSTRACT

A load-responsive pressure reducing valve assembly for hydraulic brake systems to be interposed between a brake master cylinder and the rear wheel brake cylinders of a wheeled vehicle and includes a fluid pressure proportioning valve which restricts the flow of fluid from the master cylinder to the brake slave cylinder during a predetermined range of increasing fluid pressure supplied therefrom to the brake slave cylinder. The assembly also incorporates an inertia-responsive valve which includes a valve member usually in the form of a ball which is responsive to a predetermined rate of deceleration so as to vary fluid pressure acting on the aforesaid proportioning valve to thereby correspondingly vary or set the reduction starting pressure of the fluid pressure proportioning valve. A preloaded piston is displaceable with the application thereto of a predetermined range of increasing fluid pressure from the master cylinder to correspondingly increase the distance which the ball valve member must travel up an incline to close the inertia-responsive valve and thereby regulate the reduction starting pressure of the reducing valve in correspondence with the distance which the inertia ball, which detects deceleration, travels and the master cylinder hydraulic pressure.

1 Claim, 4 Drawing Figures

LOAD-RESPONSIVE PRESSURE REDUCING VALVE DEVICE FOR USE IN A VEHICLE BRAKE SYSTEM

CROSS REFERENCE TO RELATED APPLICATION

This is a continuation of application Ser. No. 776,655 filed Mar. 11, 1977 now abandoned.

BACKGROUND OF THE INVENTION

1. Field of Invention

The present invention relates generally to hydraulic braking systems of motor vehicles and, more particularly, to fluid pressure regulating devices to be incorporated in such braking systems.

More particularly, this invention relates to a load-responsive pressure reducing valve assembly which is so constructed that a starting pressure for the pressure reducing operation thereof whereby an input hydraulic brake pressure from a master cylinder is changed to an output hydraulic brake pressure in a predetermined ratio, is controlled by means of a pressure proportioning valve which restricts the flow of fluid from the master cylinder to a brake wheel cylinder during a predetermined range of increasing fluid pressure supplied to the wheel brake cylinder. The device is capable of distributing the hydraulic brake pressure, corresponding to a transient weight transfer from rear wheels of the vehicle to the front wheels caused by the braking operation, to front and rear braking means by varying the starting pressure for brake fluid pressure reduction to the rear braking means in response to load and deceleration of the vehicle.

2. Discussion of the Prior Art

It is a well known fact that when a wheeled vehicle such as an automobile or truck having a brake system on the front and rear wheels is braked, the braking causes a forward transfer of the load which occurs due to the deceleration inertia of the vehicle and thereby reduces the load on the vehicle rear wheels and consequently reduces the contact of the rear wheels with the ground surface. Thus, the road holding ability of the rear wheels decreases, causing the rear wheels to lock under braking application which, in turn, causes dangerous skidding and possible loss of control of the vehicle. It is also known that this tendency is even more likely to be observed in small sized trucks which have a large ratio of load variation and which also have a short wheel base or distance between the front and rear wheel axles.

A number of attempts have been proposed for accomplishing the above-described pressure reduction operation, wherein the fluid pressure supplied to the rear wheel brakes is reduced to prevent such skidding and provide maximum brake efficiency under varying vehicle load conditions. One such apparatus is illustrated in U.S. Pat. No. 3,802,750, wherein the starting point of pressure reduction in a reducing valve is delayed under conditions of a heavy vehicle load by utilizing the characteristic that the vertical distance between the rear wheel axle and the loading platform of the vehicle is shortened with the application of the load. Another apparatus of the prior art is disclosed in U.S. Pat. No. 3,317,251, wherein the operation of the reducing valve is initiated only when the hydraulic pressure from the master cylinder is prevented from being transmitted to the rear wheel brake cylinders by means of an inertia ball valve member which moves in response to the deceleration of the vehicle.

Another known method is illustrated in U.S. Pat. No. 3,944,292, wherein the pressure reducing operation at the time of a heavy load condition is delayed by controlling the starting pressure of the pressure reduction operation of the reducing valve in response to or in accordance with the hydraulic pressure of the master cylinder at the time the inertia sensor senses the braking deceleration and moves. Another example of this type of sensor is also illustrated in U.S. Pat. No. 3,825,303. However, in load-responsive pressure reducing valves of this type, a shortcoming is observed when used in vehicles which display a tendency of not exhibiting any significant or definite difference in the relationship between braking hydraulic pressure and braking deceleration when it has a light load condition and when it has a heavy load condition. In this situation, the pressure reducing valve is thus apt to display the pressure reducing characteristic for a light load when, in fact, the vehicle is under a heavy load condition. This type of pressure reducing valve thus has the shortcoming that the braking force applied to the rear wheels tends to be insufficient under heavy load conditions notwithstanding its relatively sophisticated and complicated construction.

It is a principal object of the present invention to provide a load-responsive pressure reducing valve assembly which is devoid of the aforementioned disadvantages and to provide such a reducing valve assembly wherein the starting point of pressure reduction is controlled by detecting the deceleration of the vehicle and further aims at providing an inexpensive load-responsive reducing valve of simpler construction and which further allows variations in the starting point of pressure reduction in response to deceleration.

SUMMARY OF THE INVENTION

One characteristic of the load-responsive pressure reducing valve assembly of the present invention is that it adopts the type of deceleration detector in which the entire reducing valve body is installed on the vehicle at a predetermined angle of inclination to provide an incline for movement thereon of the inertia ball or inertia-responsive valve member, and dispenses with complicated mechanisms of the prior art wherein the angle of inclination of the reducing valve body or housing is varied for light load conditions and heavy load conditions. The pressure reducing valve of the present invention also does away with complicated mechanisms which restrict the movement of the inertia ball or inertia-responsive valve member.

Another characteristic of the load-responsive pressure reducing valve assembly of the present invention is that the starting point or reduction starting pressure of the pressure reduction operation varies first of all in correspondence to the distance which the inertia ball or inertia-responsive valve member, which is detecting deceleration of the vehicle, must travel, and secondly in correspondence to the master cylinder hydraulic pressure at that time. The distance over which the inertia ball or inertia-responsive valve member rolls or moves and the propagation velocity of the hydraulic pressure filling the space surrounding the inertia-responsive valve member are controlled.

Another characteristic of the pressure reducing valve assembly of the present invention is that when a predetermined hydraulic pressure from the master cylinder is exceeded, a piston within the valve assembly housing is depressed by the pressure thereby increasing the distance over which the inertia ball or inertia-responsive valve member must travel, as the inertia ball is always in contact with the piston until such time that a preset or predetermined deceleration is exceeded.

Yet another characteristic of the reducing valve assembly of the present invention is that the operating hydraulic pressure of the master cylinder itself is utilized as the pressing or bias means to control the starting point of the pressure reduction operation. Accordingly, it is thus made possible to control this hydraulic pressure over a very broad range with the use of small or limited mechanical space, whereas many of the conventional reducing valve assemblies require the use of a coil spring for this function, which creates problems of increased required space for installation and manufacturing error.

The load-responsive pressure reducing valve assembly of the present invention for hydraulic brake systems is adapted to be interposed between a fluid motor (brake master cylinder) and at least one brake cylinder of a wheeled vehicle, and includes a fluid pressure proportioning valve means for restricting the flow of fluid from a fluid inlet to a fluid outlet during a predetermined range of increasing fluid pressure at the outlet and also includes an inertia-responsive means that incorporates an inertia-responsive member responsive to a predetermined rate of deceleration of the assembly or vehicle to travel a predetermined distance up an incline to cause the inertia-responsive means to thereby set the starting pressure of the aforesaid predetermined range of increasing fluid pressure or thereby set the reduction starting pressure of the valve assembly. The improvement resides in means for increasing this predetermined distance of travel of the inertia-responsive member after a predetermined fluid pressure at the aforesaid inlet of the valve assembly from the master cylinder has been exceeded, or in other words, during a predetermined range of increasing fluid pressure at the aforesaid inlet.

In the preferred embodiment of the present invention, the pressure at the inlet of the assembly from the master cylinder is itself used as the means to bias the fluid pressure proportioning valve means to vary or regulate the reduction starting pressure. The inertia-responsive member is thus a valve member that is responsive to a predetermined rate of deceleration of the assembly or vehicle to roll a predetermined distance up an incline to close a normally open passage of fluid from the inlet of the assembly to a chamber or cavity within the assembly wherein the pressure of the fluid directly biases the fluid pressure proportioning valve to determine the starting point of the pressure reducing operation of the valve.

One means for increasing the aforesaid predetermined distance of travel of the inertia-responsive valve member or ball is by the use of a piston which is biased toward the inertia-responsive valve member to or against a stop and always engages the valve member at rest on the down side of the incline upon which the valve member is resting, unless the aforementioned predetermined deceleration point is attained such that the ball or valve member rolls up the incline away from the piston. The piston is displaceable against a spring bias by fluid under pressure from the inlet or master cylinder after attaining a predetermined limit to thereby increase this predetermined distance of travel.

If it is desired to make the inertia-responsive valve member a variable deceleration detection type, then the aforementioned incline upon which the valve member must travel is provided with a curved convex surface to thereby increase the predetermined magnitude of detected vehicle deceleration with an increase of travel surface.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE PREFERRED EMBODIMENT

Figure 1:
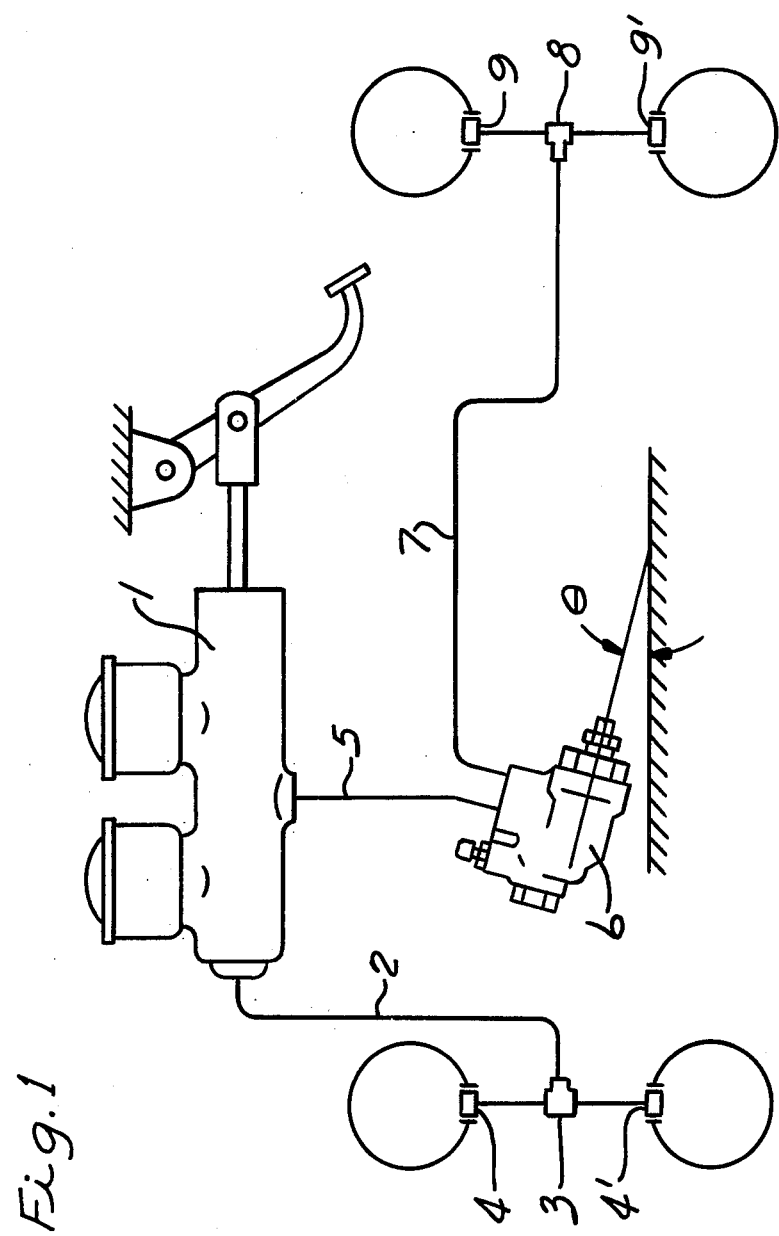
FIG. 1 is a schematic diagram of a vehicle braking system utilizing a load-responsive pressure reducing valve assembly according to the teachings of the present invention.

Referring to the drawings, FIG. 1 diagrammatically illustrates a vehicle braking system for a wheeled vehicle utilizing the load-responsive pressure reducing valve assembly of the present invention and schematically illustrates the flow diagram of the system.

Hydraulic braking pressure is generated in the conventional tandem master cylinder 1 by means of the brake pedal and linkage illustrated and the hydraulic fluid is directed through conduit 2 and distributed through triple connector 3 to the left and right front wheel brake cylinders 4 and 4' respectively. Fluid pressure is distributed to the rear wheel brake cylinders 9 and 9' from the tandem master cylinder 1 through conduit 5 via the reducing valve body or assembly 6 of the present invention and conduit 7. The reducing valve assembly housing 6 is installed on a portion of the motor vehicle at an angle of inclination $\theta$ corresponding to the deceleration of the vehicle to be detected. The brake fluid exits the pressure reducing valve assembly 6 via conduit 7 and is then distributed through triple connector 8 to the right and left rear wheel brake cylinders 9 and 9' respectively.

Figure 2:
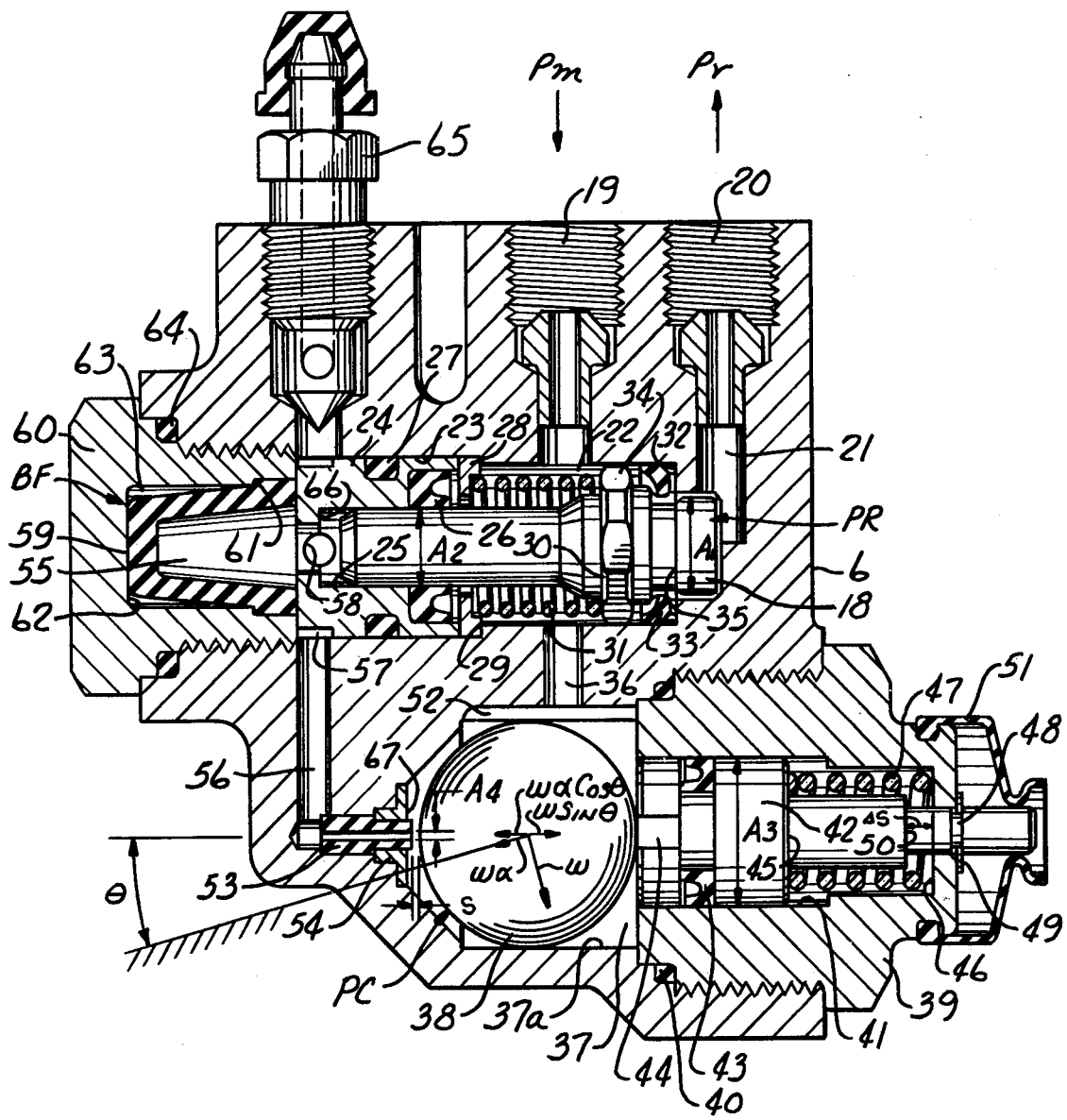
FIG. 2 is a cross-sectional view showing the load-responsive pressure reducing valve assembly of the present invention.

Referring next to FIG. 2, the interior construction of the reducing valve assembly shown in FIG. 1 is disclosed. The body or housing 6 of the reducing valve assembly is divided into three major portions or sections, namely, the proportional pressure reduction section PR, the hydraulic pressure controlling section PC and the pressure buffer section BF.

The proportional pressure reduction section PR incorporates a fluid pressure proportioning valve for restricting the flow of fluid fed to the fluid inlet 19 from master cylinder 1 to the fluid outlet 20 during a predetermined range of increasing fluid pressure at the outlet 20. This fluid pressure proportioning valve consists of a plunger 18 which is axially moveable in a first cavity or chamber 22 within the housing 6. The plunger 18 also extends to the left toward a second cavity 55 within the housing 6.

The plunger 18 is provided with a valve head 35 which is cooperable with valve seat 33 to selectively establish and interrupt communication between the first fluid inlet port 19 and the fluid outlet port 20 as the plunger 18 is axially moved.

Valve head 35 is received within chamber 21 which in turn is connected to output port 20 which leads to the rear wheel brake cylinders. The other end or stem end of plunger 18 is exposed to second cavity or chamber 55 through a slide fluid seal from the first cavity 22 for biasing plunger 18 to a position establishing communication between first inlet port 19 and outlet port 20 by fluid under pressure in second cavity or chamber 55. Fluid under pressure in chamber 55 will bias plunger 18 to the right so that the plunger head in chamber 21 does not engage valve seat 32 thereby establishing communication between first inlet port 19 and outlet port 20.

The stem portion of plunger 18 is slidably received in the central bore 25 of seal holder 24 which in turn is seated in bore 23. Spring retainer 28 is also held in position within bore 23 in butting engagement against annular shoulder 29 by pressure applied by seal holder 24 which, in turn, is retained in position by means of end cap 60 which is threadably received in housing 6 as indicated. Seal holder 24 is constructed to block the direct passage of hydraulic fluid under pressure from the first cavity or chamber 22 directly into the second cavity or chamber 55 by means of the cup seal 26 and O-ring 27.

Preload compression spring 31 is held under compression between spring retainer 28 and the flange portion 30 of plunger 18 as illustrated.

The annular seal valve or valve seat 33 is illustrated and described in detail in U.S. Pat. No. 3,423,936. This Patent may be referred to to explain the basic cooperative pressure reducing function or operation that occurs between valve plunger 18 and valve seat 33.

Seal valve or valve seat 33 is made of an elastic material and is sandwiched between the annular shoulder 32 and the right side or end of plunger 18. Hydraulic fluid under pressure PM from the master cylinder enters through the first inlet port 19 into the first cavity or chamber 22 and passes through the crescent shaped passages 34 formed between plunger 18 and the wall of cavity 22 and then continues to flow between valve seat 33 and plunger 18 on into chamber 21 and out outlet port 20. This fluid passage or communication between inlet port 19 and outlet port 20 is interrupted when plunger 18 moves to the left so that the head 35 of the plunger in chamber 21 engages valve seat 33. This pressure reducing valve thus proportionally reduces the hydraulic fluid pressure fed to the output 20 and subsequently the rear wheel brake cylinders by opening and closing communication of valve head 35 with valve seat 33. A more detailed explanation of the operation of this portion of the reducing valve may be obtained by reference to lines 16 through 47 of U.S. Pat. No. 3,736,031 issued May 29, 1973.

The third cavity or chamber 37 in the hydraulic pressure controlling seal-in section PC is connected by second inlet port 36 to the hydraulic fluid under pressure PM from the master cylinder via the first chamber or cavity 22. Inertia ball 38 is positioned in the center of third cavity 37. The right side or end of the third chamber or ball chamber 37 is closed by means of plug 39 that is threadably received in reducing valve body or housing 6. An airtight seal is maintained between third cavity 37 and the exterior by means of O-ring 40.

In the bore 41 of this plug 39, a piston 42 is slidably received such that the left end of the piston 42 contacts the inertia ball 38 at rest. Hydraulic pressure within the third chamber 37 will act on the piston cup seal 43 via the crescent groove 44 to urge piston 42 to the right against the compression of preload spring 47 for the maximum possible displacement of ∆s indicated by the double-headed arrow. This displacement of piston 42 increases the distance of travel for inertia ball 38 over incline 37a.

Preload spring 47 is sandwiched in position between the annular shoulder 45 of piston 42 and the annular shoulder or end wall 46 of the fourth cavity or chamber 41 within housing 6 or plug 39.

The installation length of preload spring 47 is determined by snap ring 49 inserted in the ring groove 48 provided on the stem or spindle portion of the piston which extends through plug 39 to the exterior. This snap ring arrangement provides a stop to limit the extent to which piston 42 will be permitted to slide or extend toward third cavity 37 due to the bias of preload spring 47. The movement of piston 42 on the other hand, is restricted to the right side by the contact of annular shoulder 50 on the stem portion of the piston with the annular shoulder 46 of the fourth cavity or chamber 41. Elastic duct boot 51 is provided with an annular snap fit to plug end plug 39 and slidably receives the outer circumference of the exposed spindle portion of piston 42 in a sealed manner to prevent the entry of dust and water into the slide contact between the piston spindle and end plug 39 and consequently into the fourth cavity or chamber 41.

An operating fluid channel 52 is provided in the top of the third or ball cavity 37 and is of a semi-cylindrical cross configuration and is provided to assist the rolling of inertia ball 38 to the left on incline 37a, as this channel 52 permits the free flow of fluid around inertia ball 38 when it is in motion to reduce pressure build up as much as possible in front of the ball as it is rolling to the left.

Check valve seat 53 of the inertia-responsive valve is constructed of a plastic tubing or material and has a central penetrating channel or bore. Check valve seat 53 is retained in the reducing valve housing 6 by means of retainer 54 at a position to preset or predetermine the small travel distance s which the inertia ball 38 must travel from its engagement with piston 42 in order to press the mouth portion of check valve seat 53 and thereby close the passage of fluid from third chamber 37 to the central bore of check valve seat 53.

The pressure buffer section BF provides two functions. First of all, it is the chamber which provides fluid under pressure to bias the fluid pressure proportioning valve consisting of piston 18 and valve seat 33 in order to determine the pressure reduction starting pressure and in addition, it also improves the liquid seal function of check valve 53 when inertia valve 38 seats therewith. More definitely, the oil pocket of cavity or chamber 55 is utilized as the control chamber to apply fluid pressures from therewithin against the exposed stem end of plunger 18 in order to control the starting pressure for the reducing operation.

The hydraulic fluid is transmitted under pressure to the oil pocket or second cavity 55 from the third cavity or chamber 37 through the central bore of check valve seat 53 and thence through passage 56 to the annular groove 57 to the radial communication passage or opening 58 provided at the left end of seal holder 24.

The pressure buffer means within the second cavity or chamber 55 provides a means wherein the second chamber 55 is enabled to expand its capacity elastically to compensate for an incremental fluid pressure increase created therein due to the closure of the inertia-responsive check valve, i.e., engagement of inertia ball 38 with inertia check valve seat 53, thereby improving the closure seal of the check valve in section PC of the load-responsive pressure reducing valve assembly.

This pressure buffer consists of an elastic wall portion 59 in the second chamber or cavity 55 which is outwardly expandable into a sealed air chamber 63. The expandable wall portion 59 may be designated as an oil pocket which is made of an elastic material and which is centrally held within end plug 60 by annular shoulder 61 and the inside bottom 62 of end plug 60 to thus form the annular air chamber 63.

The end plug 60 is threadably secured in the reducing valve body or housing 6 as indicated and thus maintains an air tight seal of both oil pocket or the second cavity 55 and air chamber 63 from the exterior. This sealed relationship is insured by the use of O-ring 64 and as formerly pointed out, end plug 60 also restricts the movement of seal holder 24 to the left, or as previously indicated, plug 60 holds seal holder 24 in its prescribed fixed position.

Reference numeral 65 generally indicates an air bleeder which is provided for the purpose of expelling air which might be entrapped in chamber or cavity 55, third cavity 37, and a second inlet port 36 or the first cavity or chamber 22. In other words, it is designed to purge the entire reducing valve assembly of air which is accidentally mixed in with the hydraulic braking fluid.

Figure 3:
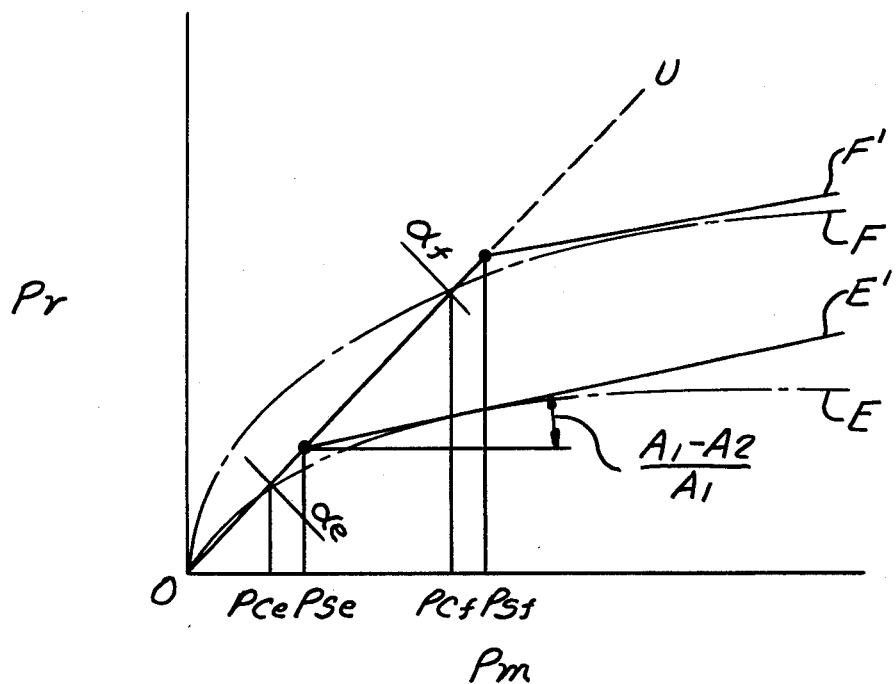
FIG. 3 is a graph showing the relationship between pressure input to the pressure reducing valve apparatus of the present invention from the master cylinder to pressure output to the wheel cylinders for light and heavy vehicle load conditions.

FIG. 3 illustrates ideal hydraulic braking pressure curves for a given vehicle with two different load conditions. The one-dot broken curve E indicates the ideal curve for a light load condition for master cylinder hydraulic fluid pressure Pm versus the output pressure Pr of the pressure reducing valve assembly of the present invention which is supplied to the rear wheel brake cylinders. The one-dot broken line F indicates an ideal curve for heavy load vehicle conditions. Curves O·P·se·E' and O·Psf·F' represent actual operating curves of the pressure reducing valve assembly of the present invention which attempt to closely correspond to the ideal curves for light load and heavy load conditions.

In order to automatically force the hydraulic pressure of the rear wheel cylinders, as shown by the polygonal line O·Pse·F', at the time of light load conditions, and the polygonal line O·Psf·F' at heavy load conditions, to correspond to these ideal hydraulic pressure curves respectively. Inertia ball 38 is utilized to set the starting pressure of the fluid pressure reduction operation. Inertia ball 38 controls both of the curves of actual operation by moving to the left on incline 37a for the predetermined distance s to contact the check valve seat 53 in order to make the actual straight line curves conform as closely as possible to the ideal curves illustrated in FIG. 3. Inertia ball 38 thus controls the starting point of the pressure reduction operation by sealing off the master cylinder hydraulic pressure Pm from the control chamber or second cavity 55 at the point in time that inertia ball 38 contacts the check valve seat 53 by traveling or rolling up incline 37a and seals the check valve bore within check valve seat 53.

If it is assumed that Pc represents the hydraulic braking pressure of the vehicle brakes and that C represents the brake factor, then the braking force B of the vehicle may be represented as shown by the following formula:

$$B = C \cdot Pc \qquad (1)$$

In addition, the ratio between the deceleration $\alpha$ of the vehicle and the acceleration of gravity g is equal to the ratio between the braking force B and the weight W of the vehicle. This relationship may be expressed as follows:

$$(\alpha/g) = (B/W) \qquad (2)$$

When a deceleration occurs in a vehicle due to braking, the following equilibrium will then occur or be established around or in relation to the inertia ball 38, if the weight of the inertia ball in the hydraulic braking liquid is designated as W:

$$W \cdot \alpha \cdot \cos\theta \geqq W \cdot \sin\theta$$

$$\alpha \geqq \tan\theta \qquad (3)$$

The inertia ball 38 will begin to move to the left as seen in FIG. 2 when the deceleration as shown by the inequality sign of Formula (3) is exceeded. Expressing this mathematically, the operation of the inertia ball 38 may be expressed as a function of the angle of installation as follows:

$$\left(\frac{\alpha}{g}\right)_\theta = f(\theta) \qquad (4)$$

As a result, the hydraulic pressure Pc which is sealed within the second chamber or oil pocket 55 may thus be expressed from Formulae (1), (2) and (4) and mathematically reduced and placed in order as shown in the following equation:

$$Pc = \frac{f(\theta)}{C} \cdot W \qquad (5)$$

On the other hand, if inertia ball 38 has traveled the distance s up the incline 37a in time T at a velocity V, then, $$s = \tfrac{1}{2} VT \qquad (6)$$

In addition, if the hydraulic pressure of the master cylinder 1 is designated Pm₂ at a given time and the velocity of pressure rise per unit time is designated as Vp, then Vp may be expressed by the following formula:

$$Vp = \frac{Pm_2}{T} \qquad (7)$$

Thus, from Formulae (6) and (7), Pm₂ may be designated as follows:

$$Pm_2 = \frac{2V_p}{V} \cdot s \quad (8)$$

Furthermore, if the installation load of the preload spring 47 is F, the spring constant thereof is K and the distance which the piston 42 is permitted to slide within its bore or chamber 41 is designated as $\Delta s$ due to the applied hydraulic pressure Pm of the master cylinder, which acts on the cross-sectional area A, of piston 42 to move the same to the right, then the equilibrium of force about the piston 42 can be expressed by the following formulae:

$$Pm_1 \cdot A_3 = F + \Delta s \cdot K$$

$$Pm_1 = \frac{F + \Delta s \cdot K}{A_3} \quad (9)$$

To mathematically state this relationship in a more meaningful manner, the hydraulic pressure Pc sealed in the oil pocket or second chamber 55 may be expressed from formulae (8) and (9) and mathematically reduced and placed in order as indicated in the following formula:

$$Pc = Pm_1 + Pm_2$$

$$Pc = \frac{F + \Delta s \cdot K}{A_3} + \frac{2V_p}{V}(s + \Delta s) \quad (10)$$

Figure 4:
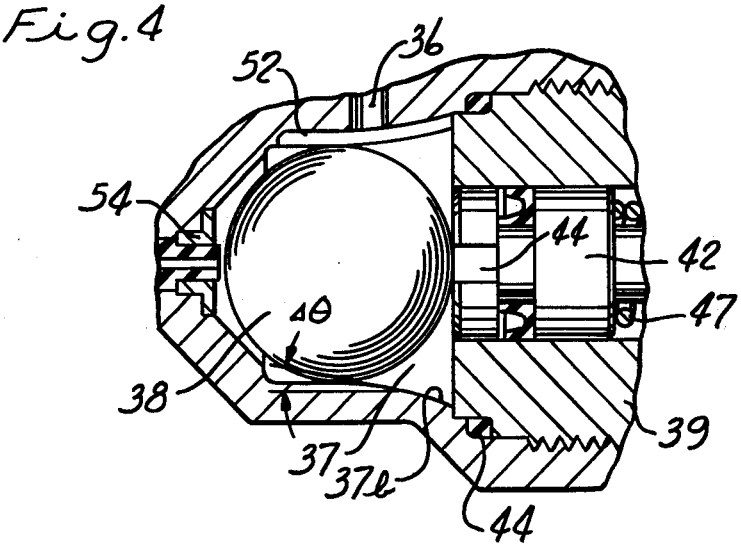
FIG. 4 is a cross-sectional view showing an embodiment variation of the inertia-responsive valve portion of the apparatus illustrated in FIG. 1 wherein the incline over which the inertia ball travels is a curved convex surface.

Formula (10) indicates the hydraulic pressure which is sealed in the oil pocket or second chamber 55 in the situation wherein the floor surface of the third cavity or chamber 37 is flat as shown in FIG. 2, thus illustrating a constant deceleration detecting type pressure reducing valve assembly. However, the floor or surface upon which inertia ball 38 rolls in chamber 37 may be provided in the form of a convex curved surface as illustrated in FIG. 4 to thus make the apparatus a variable deceleration detection type wherein the detected deceleration increases with the angle of tangent $\Delta\theta$, which indicates the increments of angle increase of the incline 37b of FIG. 4.

With reference again to FIG. 3, the operation of the reducing valve assembly illustrated in FIG. 2 will be explained with regard to the polygonal line 0·Pse·E', which represents the pressure reduction characteristics of the apparatus for a light load condition.

Referring to FIG. 2 for this example, the input hydraulic pressure Pm supplied from the master cylinder to port 19 is transmitted directly to the output port 20 via the annular gap between plunger 18 and the seal valve or valve seat 33 as plunger 18 is urged under the bias of compression spring 31 to the far right as indicated in the Figure. Protrusions on the left side of valve seat 33 permit the fluid to pass the valve seat to the outlet port 20. Accordingly, if the hydraulic pressure Pc within second chamber or cavity 55 at the time inertia ball 38 contacts check valve seat 53 under the influence of an applied deceleration ae as shown in Formula (10) is designated as Pce, the equilibrium of plunger 18 may be mathematically illustrated by the following formula:

$$Pce \cdot A_2 + f \leq Pm \cdot A_2 \quad (11)$$

wherein
 $A_2$ is the cross-sectional area of the stem portion of plunger 18 as indicated in the Figure, and
 f is the installation load of preload spring 31.

The principle object of preload spring 31 is to restore plunger 18 to its original or normal position after each time the fluid pressure proportioning valve has made a closure by plunger 18 moving to the left to thereby engage the annular valve head 35 with the inner diameter of valve seat or seal 33 to reduce or restrict fluid pressure flow from the master cylinder to the rear wheel brake cylinders. Another object of preload spring 31 is to guarantee minimal necessary braking force applied to the brake pedal indicated in FIG. 1 even if the installation angle $\theta$ shown in FIG. 2 may become nearly equal to zero when the vehicle is descending a steep slope and the inertia ball 38 thus moves to the left as seen in FIG. 2 at a deceleration which is less than the set or predetermined deceleration rate, wherein a hydraulic pressure will be sealed in the oil pocket or second cavity 55 which may even be near to zero.

From the foregoing, one can derive from Formula (11) the following formula in regard to the master cylinder pressure Pm:

$$Pm \geq Pce + \frac{f}{A_2} \quad (12)$$

Thus, the hydraulic pressure Pm from the master cylinder at the moment wherein the conditions of Formula (12) are caused to have an equality sign, the pressure Pm becomes the pressure Pse required to start the pressure reducing operation.

When the master cylinder pressure Pm increases a sufficient amount to attain the equality sign of Formula (12) and thereafter increases to attain the inequality sign thereof, the plunger 18 will move to the left due to the partial pressures which act against the larger area A1 of piston head 35 in chamber 21 opposed to the smaller areas exposed to chamber 22, such that the other circumference of valve head 35 seats in the inner circumference of the valve seat 33 thereby temporarily blocking the passage of hydraulic fluid from first input port 19 to output port 20. The equilibrium of hydraulic pressure around or on opposite sides of plunger 18 at this point in time may be expressed as follows:

$$Pr \cdot A_1 = (A_1 - A_2)Pm + f + Pce \cdot A_2 \quad (13)$$

where Pr is the output hydraulic pressure supplied to the rear wheel brake cylinder through output 20,
 $A_1$ is the cross-sectional area of valve head 35.

From Formula (13), the output hydraulic pressure may be further reduced and expressed as follows:

$$Pr = \frac{A_1 - A_2}{A_1} \cdot Pm + \frac{f}{A_1} + \frac{A_2}{A_1} \cdot Pce \quad (14)$$

The relationship expressed in this Formula between the input and the output hydraulic pressures may be seen to satisfy the polygonal line O·Pse·E' illustrated in FIG. 4 for light load conditions.

$(A_1 - A_2)/A_1$ in Formula (14) represents the ratio of pressure reduction after commencement of the pressure reducing operation.

In a like manner, when piston 42 has moved to the right in FIG. 2 under the influence of Pm for vehicle deceleration on the heavy load side, and the hydraulic pressure Pc shown in Formula (10) has thus become or attained level Pcf, an equilibrium of Formula (14) with Pce substituted by Pcf, will be established and, at the same time as Pse moves to the level of Psf, E' makes a parallel translation to F' as seen in FIG. 3 and thereby effects load-responsive proportionating pressure reduction for heavy load conditions.

In either load condition, when Pm reduces from a value on the line E' or F' in FIG. 3, Pm does not follow Formula (14). Stated in a different manner, and with reference to Formula (13), the hydraulic pressure Pm applied to the difference in area of plunger 18 ($A_1 - A_2$) reduces, the equilibrium of the plunger 18 in accordance with Formula (13) is broken, and the value head 35 moves even further to the left while retaining its sealed relationship of closure with valve seat 33 and the hydraulic fluid or liquid of higher pressure in output port 20 flows into the first cavity 22 on the input port 19 side of the valve seat via the outer circumference of the seal valve or seat 33 and, thereafter, Pr reduces as Pm reduces. The extreme leftward movement of plunger 18 at this point in time is restricted by means of the annular shoulder 66 within seal holder 24.

Even if the hydraulic pressure applied from the master cylinder to the rear wheel brake cylinders is reduced from high braking pressure by removal of brake application to the master cylinder such that the vehicle gradually decelerates below the preset deceleration at which check valve 53 will close, inertia ball 38 will still remain in contact with check valve 53 as long as the equilibrium of the following formula holds true, $A_4$ being the cross-sectional area of the central hole of the check valve seat 53:

$$w \cdot \sin \theta \geq Pm \cdot A_4 \qquad (15)$$

However, if the master cylinder pressure Pm reduces such that the left side of Formula (15) becomes greater than the right side as indicated by the inequality sign, the inertia ball then moves to the right as viewed in FIG. 2 down incline 37a and the hydraulic pressure within the third chamber or ball chamber 37 becomes equal to that of second chamber or control chamber 55.

One of the major sections of the pressure reducing valve assembly, as previously explained, is the pressure buffer section BF which includes the second cavity or chamber 55. An elastic wall portion in the form of an elastic oil pocket 59 is provided for chamber 55. The first function of oil pocket 59 is explained as follows: when inertia ball 38 presses against check valve 53, it compresses the elastic material of the check valve seat such that the hydraulic pressure Pc which is sealed in the chamber 55 of pressure buffer section BF at that moment becomes slightly higher due to this compression effect. Although the pressing force Pm·$A_4$ of inertia ball 38 against the check valve seat 53 is restricted due to the fact that the outer circumference of the inertia ball contacts the end surface 67 of retainer 54, nevertheless, this increase in pressure of ΔPc would have the effect of pushing the inertia ball 38 back off its check valve seat 53. To prevent this displacement of the inertia ball from its valve seat, oil pocket 59 elastically protrudes on air chamber 63 in end cap 60 to absorb this small pressure increase ΔPc and thereby cancels the possible undesirable effects of ΔPc on the fluid pressure proportioning, valve while at the same time improving the liquid sealing capabilities of the check valve consisting of inertia ball 38 and check valve seat 53.

The second function of the pressure buffer section is to compensate for the event that plunger 18 moves to the left as viewed in the figure to initiate the pressure reduction operation by having valve head 35 press against seal valve seat 33 when the condition $Pm > Pc + (f/A_2)$ has been attained. When this occurs, the hydraulic pressure Pc in the chamber 55 of pressure buffer section BF will increase by ΔPc, due to the leftward displacement of plunger 18 into the chamber. In order to cancel this effect, oil pocket 59 will elastically protrude into air chamber 63 to the extent necessary to absorb ΔPc and thereby stabilize the pressure level of Pc.

By virtue of the above-described valve assembly construction, the load-responsive reducing valve assembly of the present invention initiates pressure reduction by means of the action of inertia ball 38 such that the behavior of inertia ball 38 determines the pressure reduction starting point at the same detected deceleration for both light and heavy load conditions, as do the inertia detecting reducing valves of the prior art. However, due to the displacement of piston 42, the point of deceleration at which pressure reduction will initiate will move in effect to the high side of the situation wherein the vehicle carries a heavy load and in addition, this construction further makes it possible to control the starting point of pressure reduction in accordance with the rate of pressure application to the vehicle brake pedal.

I claim:

1. In a brake system on a vehicle provided with a deceleration-responsive reducing valve having a brake fluid inlet connected to a brake fluid motor, a brake fluid outlet connected to a wheel brake cylinder for the rear wheels of said vehicle, and a chamber providing communication between said inlet and said outlet; said deceleration-responsive reducing valve including therein:

a plunger disposed in said chamber and having a first end face exposed to fluid pressure at said brake fluid inlet and a second end face exposed to fluid pressure at said brake fluid outlet of the reducing valve for restricting fluid pressure applied to said wheel cylinder when a predetermined operation-starting fluid pressure at said outlet acting on said second end face of said plunger is attained;

means to determine said operation-starting fluid pressure of said plunger in relation to the weight of the vehicle and any load carried thereby and including an inertia ball resting on an inclined surface for rolling up said inclined surface for a required roll travel distance upon deceleration of the vehicle to seal a normally open passage of braking fluid from said inlet under a then existing fluid pressure to a cavity, said plunger including a third end face exposed to said fluid pressure in said cavity, which sealed fluid in said cavity cooperates with said third end face of said plunger to determine said operation starting fluid pressure thereof; and means to increase the pressure of fluid to be sealed in said cavity by said inertia ball when the vehicle is in a loaded condition and including a piston provided on the downward side of said inclined surface and against which said inertia ball normally resets when deceleration is not acting on the system, said piston displaceable against a biased spring by brake fluid under pressure from the brake fluid motor to displace the piston in a direction to increase said required roll travel distance of said inertia ball to seal said passage when a predetermined fluid pressure from the brake fluid motor is exceeded when the vehicle is in a loaded condition.

* * * * *